United States Patent [19]

Skochdopole et al.

[11] 3,933,959

[45] Jan. 20, 1976

[54] PREPARATION OF DUNNAGE MATERIAL

[75] Inventors: Richard E. Skochdopole; Keith R. Denslow, both of Midland, Mich.

[73] Assignee: The Dow Chemical Company, Midland, Mich.

[22] Filed: Sept. 5, 1972

[21] Appl. No.: 286,305

Related U.S. Application Data

[60] Continuation-in-part of Ser. No. 95,705, Dec. 7, 1970, abandoned, which is a division of Ser. No. 732,270, May 27, 1968, Pat. No. 3,723,240.

[52] U.S. Cl. ............. 264/45.5; 206/523; 260/2.5 B; 260/2.5 E; 264/45.9; 264/46.1; 264/51; 264/129; 264/151; 264/174; 264/343; 428/369; 428/394; 428/398; 428/399

[51] Int. Cl.² ................. B29D 27/00; B65D 65/44

[58] Field of Search ... 264/51, 53, DIG. 8, DIG. 47, 264/174, 45, 45.5, 45.9, 46.1, 129, 151, 174, 343; 206/523; 428/389, 394, 398, 399

[56] References Cited
UNITED STATES PATENTS

| | | | |
|---|---|---|---|
| 3,066,382 | 12/1962 | Zweigle et al. | 264/51 X |
| 3,121,132 | 2/1964 | Del Bene | 264/53 X |
| 3,147,321 | 9/1964 | Oswald et al. | 264/53 |
| 3,244,785 | 4/1966 | Hollandsworth | 264/174 X |
| 3,251,728 | 5/1966 | Humbert et al. | 264/51 X |
| 3,262,625 | 7/1966 | Russell et al. | 264/53 X |
| 3,275,720 | 9/1966 | Ohsol | 264/53 X |
| 3,435,103 | 3/1969 | Medhurst | 264/53 |
| 3,461,197 | 8/1969 | Lemelson | 264/174 X |
| 3,582,418 | 6/1971 | Schuur | 264/DIG. 8 |
| 3,594,459 | 7/1971 | Keuchel | 264/DIG. 8 |

*Primary Examiner*—Philip Anderson
*Attorney, Agent, or Firm*—Robert B. Ingraham

[57] ABSTRACT

Generally linear foamable strandular particles which are asymmetrical about a plane generally containing the longitudinal axis provide a desired curled dunnage material when heated to cause foaming. A wide variety of methods may be used to introduce the desired asymmetry.

6 Claims, 7 Drawing Figures

INVENTORS.
Richard E. Skochdopole
Keith R. Denslow
BY
Robert B. Ingraham
AGENT

PREPARATION OF DUNNAGE MATERIAL

This application is a continuation-in-part of our co-pending application Ser. No. 95,705, filed Dec. 7, 1970 and now abandoned, which in turn is a divisional application of our co-pending application Ser. No. 732,270, filed May 27, 1968 now U.S. Pat. No. 3,723,240.

This invention relates to an improved method for the preparation of dunnage producing material.

Foamed plastic particles or strands are known to be highly desirable for packaging articles for protection in shipping by absorption of shock and isolation of the article from the walls of the shipping container. Typical materials are set forth in U.S. letters Pat. No. 3,066,382; 3,188,264 and 3,251,728. Short hollow cylinders of foam plastic are also employed as a dunnage or packing material. Although such packing materials are highly desirable, they suffer from a substantial and significant problem and that is the high cost of shipping expanded particles due to their very low bulk density. It is, therefore, very desirable to ship a product having a maximum bulk density and subsequently expanded at the point of use into the desired form. Two general types of foamed particulate plastic packing are employed. One is typified by the particles of U.S. Pat. No. 3,188,264 which is a pourable packing; that is, it flows readily. The other variety of packing is depicted in U.S. Pat. Nos. 3,066,382 and 3,251,728. Such packing generally is not free-flowing and has a very strong tendency to interlock by virtue of the fact that the strands have a curled and twisted configuration. In general, a formable strand or particle on foaming will assume a configuration which is not an exact replica of the unfoamed configuration, but generally the foamed configuration will be similar to the unfoamed configuration. Thus, if a cylindrical strand is foamed, minor distortion from a cylindrical configuration occurs. Frequently, such distortion is relatively minor and is insufficient to provide bulking and curling of the strand into a configuration desirable for packing. For example, short helical segments of from one to four or five turns are often desirable as such a configuration provides a dunnage material of minimal bulk density and a reasonable degree of interlocking under pressure. Such particles are quite unsatisfactory to ship in quantity and the unfoamed precursor of such a strand or particle also has a relatively low bulk density and is similarly undesirable.

It would be advantageous if there were available a method for the preparation of elongate generally linear foamable plastic bodies which, on expansion, would distort, twist and curl to a desired degree.

It would also be beneficial if there were available an improved method for the preparation of generally linear expandable synthetic resinous particle which, on heating to a foaming temperature, would curl to form a generally helical configuration.

It would further be desirable if there were available a simple process for the preparation of dunnage material employing an elongate generally linear strand as a transportable intermediate.

These benefits and other advantages in accordance with the present invention are achieved in a method for the preparation of foamable particles, the method comprising providing a heat plastified mass of a synthetic resinous material containing an expanding agent, the heat plastified mass being capable of expansion to form a plurality of closed gas-filled cells, maintaining the heat plastified foamable material under pressure, subsequently cooling the heat plastified mass, forming the mass into a plurality of elongate strands, discharging the strands from a shaping configuration without significant foaming occurring in the strands, subsequently severing the strands to form a plurality of elongate elements of relatively high bulk density, subsequently heating the elongate elements or strand portions to an elevated temperature sufficient to cause them to expand and form a plurality of gas-filled cells therein, the improvement which comprises introducing radial asymmetrical foamability into the strandular material prior to foaming to thereby cause curling to a desired degree upon foaming.

Strands or particles in accordance with the present invention are readily prepared from a wide variety of synthetic resinous materials including polymers which comprise, in chemically combined form, at least about 70 percent by weight of at least one alkenyl aromatic compound having the general formula

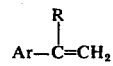

wherein Ar represents an aromatic hydrocarbon or a nuclear halohydrocarbon radical of the benzene series, and R is hydrogen or the methyl radical. Examples of such alkenyl aromatic polymers are homopolymers of styrene, α-methylstyrene, o-, m-, and p-methylstyrene, ar-ethylstyrene, tertiary butylstyrene and ar-chlorostyrene; the copolymers of two or more of such alkenyl aromatic compounds with one another; and copolymers of one or more of such alkenyl aromatic compounds with minor amounts of other readily polymerizable olefinic compounds such as divinylbenzene, methylmethacrylate, or acrylonitrile, etc. Also suitable are aliphatic olefin polymers which are normally solid polymers obtained by polymerizing at least one α-monolefinic aliphatic hydrocarbon containing from 2 to 8 carbon atoms, such as ethylene, propylene, butene-1, pentene-1, 3-methylbutene-1, 4-methylpentene-1, 4-methylhexene-1, or 5-methylhexene-1, alone, with one another, or with various other polymerizable compounds, but the polymers of ethylene or propylene alone are preferred because they produce tough resilient and fine-celled chemically inert products. Examples of suitable polymerizable organic compounds which can be polymerized with ethylene or propylene are vinyl acetate, $C_1$-$C_4$ alkyl acrylates, such as ethyl acrylate, styrene, lower alkyl esters of methacrylic acid, such as methylmethacrylate, tetrafluoroethylene and acrylonitrile. Copolymers containing in chemically combined form a predominant amount; e.g., 75 percent by weight or more, of ethylene or propylene with not more than 25 percent of one or more of such other polymerizable compounds can be used. The aliphatic olefin polymers can be modified by blending with polymeric materials; e.g., polyisobutylene, acrylonitrile/-butadiene rubbers, poly(2-chlorobutadiene-1,3), polyisoprene, or ethylene/vinylacetate copolymers. Halogenated aliphatic olefin polymers can also be used, as well as polymers of a wide variety of ethylenically unsaturated monomers which produce foamable thermoplastic compositions including polymers of isopropenyl toluene, vinyl naphthalene, and the esters of α-methylene aliphatic monocarboxylic acids, such as methyl acrylate, ethyl acrylate, n-butyl acrylate, isobutyl acrylate, dodecyl acrylate, 2-chloroethyl acrylate, 2-chloropropyl acrylate, 2,2'-dichloroisopropyl acrylate, phenyl acrylate, cyclohexyl acrylate, methyl α-chloroacrylate, methylmethacrylate, ethylmethacrylate, methylethacrylate, acrylonitrile, methacrylonitrile; vinyl esters, such as vinyl acetate, vinyl chloroacetate, vinly propionate, vinyl butyrate, vinyl laurate, vinyl stearate, vinyl ethers such as vinyl methyl ether, vinyl isobutyl ether, vinyl 2-chloroethyl ether; vinyl ketones, such as vinyl methyl ketone, vinyl hexyl ketone, methyl isopropenyl ketone, isobutylene, vinylidene halides, such as vinylidene chloride, vinylidene chlorofluoride, N-vinyl compounds such as N-vinyl pyrrole, N-vinyl carbazole, N-vinyl indole, N-vinyl succinimide, acrolein, methacrolein, acrylamide, methacrylamide, N-methylol acrylamide; and allyl compounds such as allyl alcohol, methallyl alcohol, allyl acetate, allyl methacrylate, allyl lactate, allyl α-hydroxyisobutyrate, allyl trichlorosilane, allyl acrylate, methallyl phosphate, and the like.

Foamable compositions of polymers are well known in the art and are prepared by incorporating therein a gas, volatile liquid or combinations of gas, volatile liquid or solid gas releasing blowing agents which cause expansion of the polymeric material on heating. It is well known in the art to extrude foamable particles by cooling the viscous melt below the blowing temperature under pressure, subsequently passing the strand into atmospheric pressure and rapidly cooling the strand to a solid or non-heat plastified state.

It is essential and critical to the present invention that at the expanding temperature asymmetry exist in the particle or strand portion to be expanded; that is, one side of the particle should expand to a lesser degree, if at all, than the other. The degree of asymmetry controls the tendency of the particle to twist and curl and form a generally non-linear configuration. Such asymmetry may be introduced into a foamable resinous material in a number of ways. For example, a generally linear strand of synthetic resin can be scraped to remove a few percent of its cross-sectional area; for example, about 5 percent, and when subjecting it to foaming conditions on expansion, the strand curls. Depending on the particular scraping pattern, a wide variety of coiled shapes are obtained. Another method of introducing asymmetry into the strand is by subjecting one side of the strand to heat sufficient to deform the strand without introducing significant foaming or slight foaming and subsequently foaming the remainder of the strand or particle. Oftentimes the region which has been previously heat treated will foam to a greater extent than the non-heat treated portion if the heating has been sufficient merely to soften a portion of the strand. Prolonged heating or repeated heating of one side of a foamed strand or particle sometimes will introduce curling in the opposite direction wherein the treated portion lies on the inside of the curve of the particle, presumably because removal or deactivation of a portion of the blowing agent results in non-uniform distribution. Localized plasticization also causes dissymmetry. Exposure of one side of a foamable strand to a plasticizer or fugitive plasticizer will also result in curling. Particularly acceptable are solvents or swelling agents applied in a relatively small quantity to one side of the particle or strand. Asymmetry is also introduced into strands by including as a minor portion of the strand an element which is non-foaming or relatively low foaming. Such strands can be prepared by use of a wire coating crosshead die wherein a strandular element such as a cotton thread is coated with the expandable material and the thread positioned within the strand and adjacent one edge thereof rather than centrally disposed as is normally done with wire coating on expansion.

The well known process of simultaneous extrusion may be used wherein a strand is extruded; a major portion of the strand is expandable and a minor portion of the strand exposed along one side thereof is relatively non-expandable. By the term "simultaneous extrusion" is meant the simultaneous extrusion of polymers, having different physical characteristics, through a single orifice to provide a unitary article.

Asymmetry is also introduced to the strand by coating one side or a portion of a side of the strand with a second material that has a peripheral modulus at a higher temperature. This is readily accomplished by solution or melt coating or by lamination of either a non-expanding or poorly expanding material. For example, the coating of one side of a strand with a lacquer which does not contain a blowing agent or contains relatively little blowing agent and has a different modulus at the expansion temperature of the strand is sufficient to cause curling when the strand is heated.

When foamable compositions containing volatile or fugacious liquids as expanding agents are utilized, foaming asymmetry is readily introduced by selecting the proper die geometry for extrusion. Thus, if a die orifice is utilized which introduces substantial asymmetry such as by providing a narrow ridge adjacent one edge of the strand, the volatile foaming agent will tend to diffuse from the ridge more rapidly than from the main body of the strand, and therefore when foamed, will expand less and cause the strand to curl and twist.

Regardless of how foaming asymmetry is introduced into the strand, many different foamed shapes are obtained depending upon the position of the asymmetry. If a non-foaming or low foaming region is introduced into a strand which is uniform in nature and extends along one side thereof from end to end, the usual tendency is to foam to a helical shape. If such a strand is twisted or the foaming asymmetry disposed in more or less of a helical manner about its outer surface, a wide variety of curled shapes are obtained, depending on the degree of foaming asymmetry, the relative length of the strand portion being foamed and the like. By intermittently or periodically reducing foaming asymmetry, foamed strands having a number of bent and straight sections will result, the simplest form of such a strand being a foamable strand having a length of three units and having foaming asymmetry introduced over a longitudinal distance of ¼ to ½ unit of length in the center of the strand. On foaming, the strand will have a generally centrally disposed bend and relatively straight leg or end portions. By introducing foaming asymmetry wherever a bend is desired, square shapes such as square U's, squares, rectangles and the like are obtained if the asymmetry is introduced along one side of the strand. However, if selective asymmetry is introduced to a strand in such a way that the asymmetry does not lie in a single plane containing the longitudinal axis of the strand, three dimensional bending occurs on foaming; that is, when foamed, portions of the strand adjacent each bend are generally coplanar and each of the portions of adjacent bends may lie in planes which are angularly disposed relative to any other plane containing a pair of strand portions. The method of the invention therefore permits the foaming of a relatively straight strand into almost any desired configuration.

Further features and advantages of the present invention will become more apparent from the following specification taken in conjunction with the drawing wherein.

Figure 1:
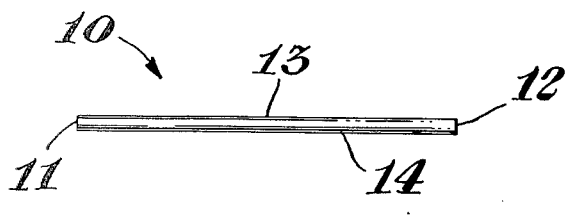
FIG. 1 depicts a view of a generally linear elongate strand in accordance with the present invention.

In FIG. 1 there is schematically depicted a strand generally designated by the reference numeral 10 having a first end 11 and a second end 12, a first side 13 and a second side 14. The sides 13 and 14 differ in modulus. The strand is composed of expandable synthetic resinous thermoplastic material.

Figure 2:
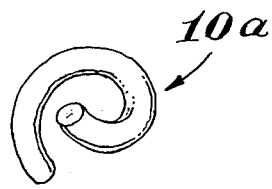
FIGS. 2, 3 and 4 depict views of a curled strand.

FIG. 2 depicts a foamed strand 10a which forms a generally spiral pattern and results from the expansion under heat of a strand such as the strand 10 of FIG. 1.

Figure 3:
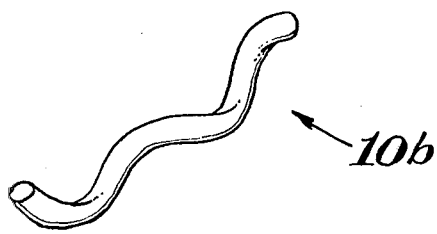

FIG. 3 depicts a foamed strand 10b having a generally helical configuration.

Figure 4:
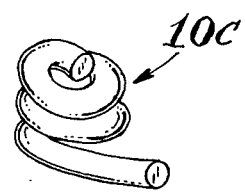

FIG. 4 depicts a foamed spiral having a generally spiral helical configuration.

Figure 5:
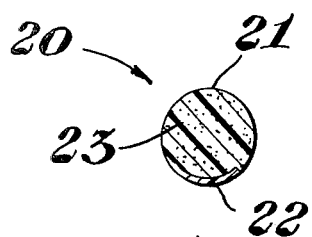
FIGS. 5, 6 and 7 depict schematic cross-sectional configurations of asymmetric strands in accordance with the invention.

FIG. 5 depicts a sectional view of a strand 20 having a first side 21 and a second side 22. The strand 20 has a major portion 23 of readily foamable thermoplastic material and a second or minor portion 24 of a high modulus or non-foamable material extending along the second side 22.

Figure 6:
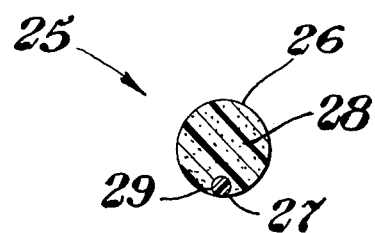

FIG. 6 depicts a cross-sectional view of a strand 25 having a first side 26 and a second side 27 and a major portion 28 of a readily foamable synthetic resinous material. A non-expandable elongate material 29 is encapsulated within the strand 25 and extends along the second side 27. The material 29 beneficially is a material of a synthetic resinous thermoplastic nature or a non-thermoplastic nature such as a textile fiber as hereinbefore described.

Figure 7:
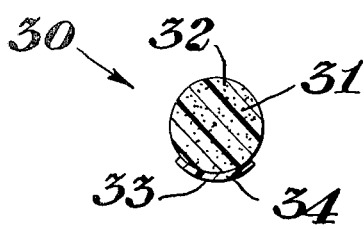

FIG. 7 depicts a sectional view of a strand 30. The strand 30 comprises a generally cylindrical foamable portion 31, having a first side 32 and a second side 33. Disposed on the side 33 is a layer of a non-expandable material 34 generally conforming to the external surface of the portion 31.

The invention is further illustrated but not limited by the following examples:

EXAMPLE 1

A plurality of foamable generally linear polystyrene strands are prepared employing the procedure set forth in U.S. Pat. No. 3,066,382. The strands are cut to provide a plurality of portions about 5.6 centimeters in length and 2.5 millimeters in diameter. A lacquer is prepared by dissolving a polymer of 85 weight percent vinylidene chloride and 15 weight percent acrylonitrile in nitromethane to provide a lacquer containing 15 weight percent solids. A number of strands are coated on one side with the lacquer generally in the manner depicted in FIG. 5 and the lacquer allowed to dry overnight. A number of the coated strands and uncoated strands are heated by exposing to steam under 10 pounds of pressure per square inch gauge for about 30 seconds. The coated strands expand to a diameter of about 7 millimeters and form a generally U-shaped particle having an outside length of about 9.5 centimeters and an inside length of about 6.4 centimeters. The uncoated particles expand to form generally linear pieces about 7 millimeters in diameter and having a length of about 9.3 centimeters.

EXAMPLE 2

Portions of foamable polystyrene strands of Example 1 are adhered to a 5 mil thick polyester film employing the vinylidene chloride lacquer utilized in Example 1. The strand portions are coated on one side with lacquer and placed on the polyester film. When the lacquer is dry, portions of the polyester film which are not adhered to the strand are trimmed away to provide a configuration generally similar to that shown in FIG. 7 wherein the polyester film has a width of about 5 millimeters. Exposure of the composite strand to steam at 10 pounds per square inch gauge for 30 seconds provides a foamed coiled strand of about 1-½ turns in a generally helical configuration.

EXAMPLE 3

Polydichlorostyrene which becomes fluid at about 225°C. is heated on a hot bar until it becomes molten. A strand of expandable polystyrene of Example 1 is rapidly drawn across the molten surface of the polydichlorostyrene to provide a thin coating of the polydichlorostyrene adhered to one side of the strand. Exposure of the polydichlorostyrene-coated strand to steam at 10 pounds per square inch gauge for 30 seconds results in the formation of a loop.

EXAMPLE 4

A portion of the foamable uncoated strands of Example 1 are scraped with the sharp edge of a knife to remove about 5 percent of the original cross-sectional area of the strand. The strands are exposed to steam at 10 pounds per square inch gauge for a period of 1 minute, the strands bent and curled at the locations where the strands are scraped. The scraped side of the strand lies on the outside of the foamed strand and the curvature becomes greater as the amount of material removed by scraping increases. Depending on the scraping pattern; that is, the material removed from the strand, gental curves, helices, pretzel strands, tightly coiled balls are obtained on foaming.

EXAMPLE 5

An untreated polystyrene strand of Example 1 is passed across the surface of a metal bar which is heated to about 175°C. The surface of the strand is flattened where it has been in contact with the heated surface. The strand is subsequently exposed to steam at a pressure of 10 pounds per square inch gauge for a period of 1 minute; the strand foams and curls.

EXAMPLE 6

An untreated polystyrene strand as employed in Example 1 is coated with xylene to wet one side of the strand. The strand is then treated with steam at a pressure of 10 pounds per square inch gauge for a period of one minute. A tightly curled foam strand is obtained.

EXAMPLE 7

A foamable strand is prepared by the extrusion of a heat purified foamable polystyrene mixture containing about 5 weight percent pentane as an expanding agent. A polymer of 25 weight percent acrylonitrile and 75 weight percent styrene is simultaneously extruded to provide a composite strand which is about 95 weight percent expandable polystyrene and about 5 weight percent styrene/acrylonitrile polymer. The styrene/acrylonitrile polymer is disposed adjacent one edge of the strand generally in the manner depicted in FIG. 6. The strand is severed into lengths of about 10 centimeters and subjected to steam at about 10 pounds per square inch gauge for about 1 minute. A tightly coiled generally helical configuration is obtained.

EXAMPLE 8

Expandable strands of Example 1 are wet with benzene on one side thereof at a location about midway between the ends and exposed to steam at a pressure of 10 pounds per square inch gauge for 30 seconds to provide a plurality of foamed strands having a centrally disposed bend of about 60°. Repetition of the foregoing procedure wherein a longitudinal central side portion of a strand wet with xylene instead of benzene provides a plurality of strands having centrally disposed bends of from about 80° to 120°. When the strands are wet with xylene at locations about 1.5 centimeters from their ends, a U-shaped configuration results. By wetting a strand with xylene at a location about 2 centimeters from each end, each dampened support being radially displaced about 90°, a strand is obtained having two bends of about 90° and the terminal leg portions are displaced about 90° from being coplanar.

EXAMPLE 9

A plurality of foamable generally linear polystyrene strands are prepared employing the procedure as generally set forth in U.S. Pat. No. 3,066,382 employing normal pentane as a blowing agent. The strands are extruded from a die having a plurality of generally circular openings having a diameter of about 0.142 inch. A V-shaped notch is formed in one side of the die openings and the notch has a depth of about 0.022 inch and a width of about 0.015 inch at its point of contact with a projected circle of the die opening. The extruded strands have a small narrow ridge along one side thereof. The strands when cut to a length of about 6 centimeters and exposed to steam under 10 pounds of pressure per square inch for about one minute, foam to provide a plurality of curled strands. Twisting of the strand on emergence from the die and subsequent foaming results in highly convoluted foamed strands.

In a manner similar to the foregoing illustrations, other foamable synthetic resinous compositions are readily formed into curled foamed strands.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention.

What is claimed is:

1. A method for the preparation of foamed dunnage in the form of particles, the method comprising providing a heat plastified mass of synthetic resinous material containing an expanding agent, the heat plastified mass being capable of expansion to form a mass containing a plurality of closed gas-filled cells, maintaining the heat plastified foamable material under pressure, subsequently cooling the heat plastified mass below the foaming temperature thereof, to provide a cooled heat plastified mass extruding the cooled heat plastified mass to form elongate strands, the mass being extruded from a shaping configuration without significant foaming occurring in the strands, subsequently severing the strands to form a plurality of elongate elements of relatively high bulk density the elongate elements being heatable to an elevated temperature sufficient to cause them to expand and form foamed strandular particles having a plurality of gas-filled cells therein, the improvement which comprises introducing, prior to severing, asymmetric foamability into the strandular particles involving altering the cross-sectional expansibility of these particles to cause one side of the strand to expand to a lesser degree, if at all, than the other, to thereby cause curling to a desired degree to form a generally nonlinear configuration upon subjecting the elements to foaming conditions.

2. The method of claim 1 wherein asymmetric foamability is introduced by deforming one side of the strands by contact with a heated surface without introducing significant foaming of the elements obtained therefrom.

3. The method of claim 1 wherein asymmetric foamability is introduced into the strands by disposing a non-foaming body at a location adjacent one side of a strand.

4. The method of claim 3 wherein the non-foaming body is a strandular material and is asymmetrically encapsulated within the strands.

5. The method of claim 1 where assymetric foamability is introduced by scraping the strands longitudinally to remove a portion of the crosssection of the strand.

6. The method of claim 1 where foaming asymmetric foamability is introduced periodically to the strands.

* * * * *